US012783062B1

(12) United States Patent
Beyhs et al.

(10) Patent No.: US 12,783,062 B1
(45) Date of Patent: Nov. 3, 2026

(54) CONTROL OF DEVICES BASED ON SPATIAL INFORMATION

(71) Applicant: Apple Inc., Cupertino, CA (US)

(72) Inventors: Michael J. Beyhs, Weingarten (DE); Julian Quintana, San Jose, CA (US); Jacob L Matlick, San Francisco, CA (US); Lichen Wang, San Jose, CA (US); Tu K. Nguyen, Fountain Valley, CA (US); Hojjat Seyed Mousavi, San Jose, CA (US); Behrooz Shahsavari, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 18/454,754

(22) Filed: Aug. 23, 2023

Related U.S. Application Data

(60) Provisional application No. 63/493,626, filed on Mar. 31, 2023, provisional application No. 63/376,930, filed on Sep. 23, 2022.

(51) Int. Cl.
*G06F 3/0346* (2013.01)
*G05B 15/02* (2006.01)
*G06F 3/01* (2006.01)
*G06F 3/16* (2006.01)

(52) U.S. Cl.
CPC ........... *G06F 3/0346* (2013.01); *G05B 15/02* (2013.01); *G06F 3/017* (2013.01); *G06F 3/165* (2013.01); *G06F 3/167* (2013.01)

(58) Field of Classification Search
CPC ........ G06F 3/0346; G06F 3/017; G06F 3/165; G06F 3/167; G05B 15/02
See application file for complete search history.

(56) References Cited

U.S. PATENT DOCUMENTS 11,422,692 B2 8/2022 Kamath et al.
2009/0054077 A1* 2/2009 Gauthier ................. H04W 4/21 455/422.1
2010/0083189 A1* 4/2010 Arlein ..................... G06F 3/017 715/863
2011/0037609 A1* 2/2011 Kim .................... G06F 3/04847 340/12.22
2011/0095980 A1* 4/2011 Sweetser ............... G06F 3/0325 345/158
2015/0012581 A1* 1/2015 Kim ........................ H04L 67/55 709/201
2015/0061842 A1* 3/2015 Yoon ...................... G04G 21/04 340/12.5
2016/0252967 A1* 9/2016 Liang .................... G06F 3/0481 345/156

(Continued)

*Primary Examiner* — Rami R Okasha
(74) *Attorney, Agent, or Firm* — Kubota & Basol LLP

(57) ABSTRACT

A control device can be used to remotely control a target device based on gestures made by a user of the control device. The control device (or a separate moderator device) may determine the location and orientation of the control device within an environment that includes one or more target devices. The control device may detect a first gesture and select a target device for control based on the location and orientation of the control device. The control device may detect a second gesture associated with an operation to be performed by the selected target device and transmit a signal indicating the operation. The signal may include an identifier of the selected target device.

20 Claims, 9 Drawing Sheets

(56) References Cited

U.S. PATENT DOCUMENTS

| | | | | |
|---|---|---|---|---|
| 2017/0255286 | A1* | 9/2017 | Jayaraj | G06F 3/0488 |
| 2018/0011555 | A1* | 1/2018 | Park | H04L 63/0853 |
| 2018/0338720 | A1* | 11/2018 | Gupta | A61B 5/6824 |
| 2019/0013018 | A1* | 1/2019 | Rekstad | G06F 3/017 |
| 2020/0092925 | A1 | 3/2020 | Foster et al. | |
| 2020/0233502 | A1* | 7/2020 | Goldberg | G08C 21/00 |
| 2020/0236502 | A1* | 7/2020 | Lee | H04M 11/00 |
| 2020/0326837 | A1* | 10/2020 | Ni | G06F 3/04847 |
| 2022/0057922 | A1* | 2/2022 | Wang | G06F 1/1626 |
| 2022/0155880 | A1 | 5/2022 | Martin et al. | |
| 2023/0076716 | A1 | 3/2023 | Dogrusoz et al. | |
| 2023/0291826 | A1* | 9/2023 | Xu | G06F 1/1694 |

* cited by examiner

CONTROL OF DEVICES BASED ON SPATIAL INFORMATION

CROSS-REFERENCE TO RELATED APPLICATIONS

This application claims the benefit of U.S. Provisional Application No. 63/376,930, filed Sep. 23, 2022, and U.S. Provisional Application No. 63/493,626, filed Mar. 31, 2023, the contents of which are incorporated herein by reference in their entireties for all purposes.

FIELD OF THE DISCLOSURE

This relates generally to systems, methods, and devices for control of target devices based on detection of spatial information related to a control device and/or a user.

BACKGROUND OF THE DISCLOSURE

Many devices can be controlled by remote control devices. For example, a television can be controlled by a remote-control device. Typically, remote control devices are used to control a single target device and support user control inputs via physical input features such as buttons, joysticks, trackpads, or touchscreens. Some remote control devices are operated using voice recognition.

SUMMARY OF THE DISCLOSURE

Some examples of the disclosure are directed to controlling one or more target devices based on detection of spatial information of a control device. For example, gesture control of one or more target devices can be based on pointing of a portion of a user or of a control device (e.g., using the location and orientation of the control device). Smart homes often contain multiple products that can potentially be remotely controlled. Such products can include lights, audio-visual equipment, or other types of electronic devices. Typically, such devices can be controlled using a dedicated remote-control device associated with the target electronic device, using a user interface displayed on another device (e.g., a smart phone) to select and control the target device, or using a smart assistant with voice recognition to select and control the target device. It may be desirable, however, to enable a user to select one or more target devices to be controlled in a manner that does not require the user to access a user interface or to remember a specific name of the target device. As described herein, a system for selecting and controlling target devices can enable target device selection using gestures. For example, the system may enable a user to select a target device by pointing at (or otherwise physically indicating) the target device. The system may determine that the user is pointing at a target device based on, for example, detection of the location of the user in the room (or of a control device carried or worn by the user), detection of a location and/or orientation of a control device, detection of a physical gesture of the user, and/or detection of a signal emitted by a control device in the direction of a target device. The user may then provide inputs for controlling the selected target device(s), such as by making additional physical gestures, providing verbal inputs, and/or providing inputs to a user interface displayed on a device.

DETAILED DESCRIPTION

Figure 1:
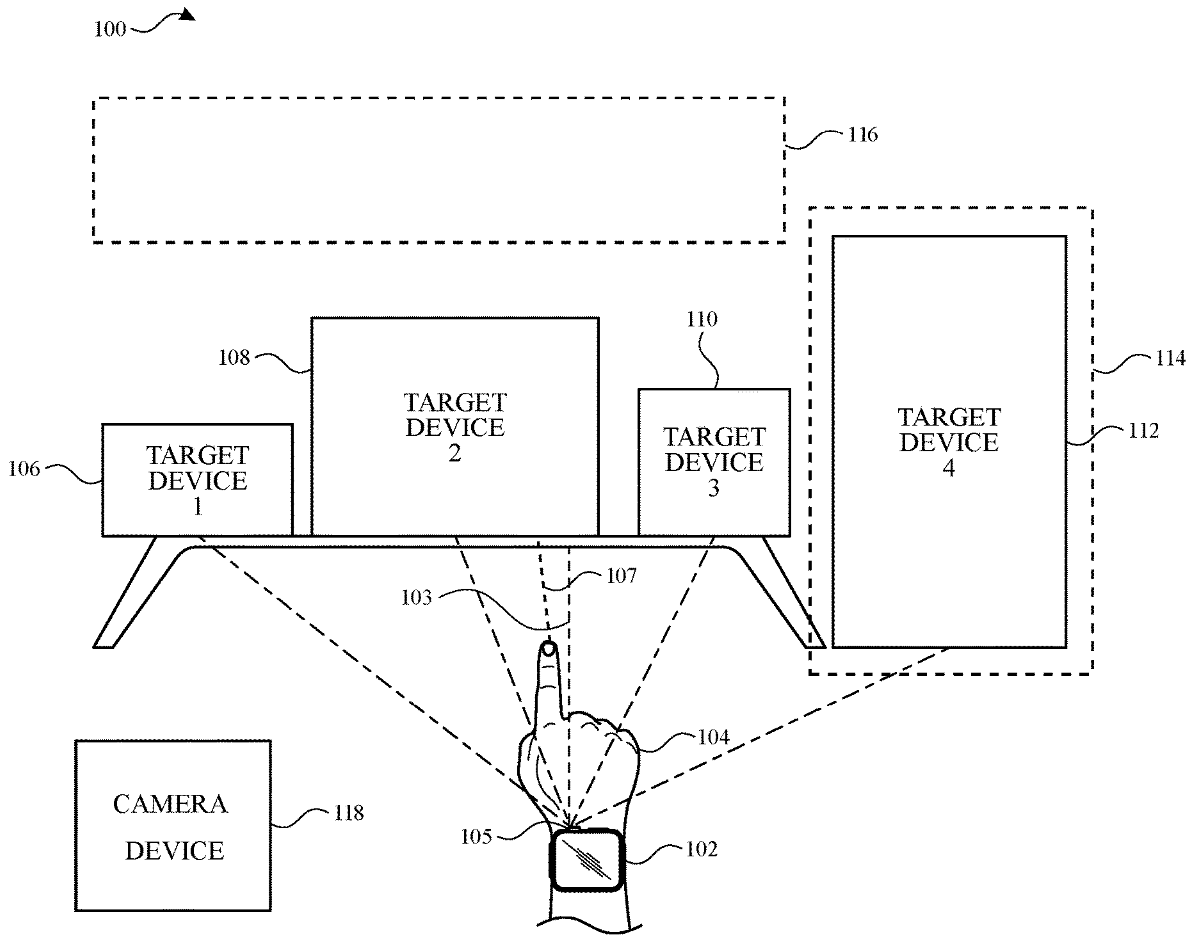
FIG. 1 illustrates an example system for control of devices based on detection of spatial information according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to systems, methods, and devices for controlling one or more target devices based on spatial information (e.g., detection of pointing of a portion of a user or of a control device carried or worn by the user). Environments, such as, but not limited to, homes, office buildings, and commercial buildings, can contain multiple products that can potentially be remotely controlled. Such products can include lights, environmental control equipment (e.g., thermostat, humidifier, fan, etc.), audio-visual equipment, or other types of electronic devices. Typically, such devices can be controlled using a dedicated remote-control device associated with the target electronic device, using a user interface displayed on another device (e.g., a smart phone) to select and control a target device, or using a smart assistant with voice recognition to select and control a target device. Each of these approaches has drawbacks, however. Dedicated remote-control devices may require the user to keep track of multiple physical control devices. Accessing a user interface to select and control a target device may be cumbersome because the user may need to retrieve and interact with a device, such as by navigating to a menu or application and providing inputs. Voice recognition may require the user to remember and clearly articulate the exact names of target devices or operations in order to accurately select and control a target device. Thus, it may be desirable to be able to select and/or control target devices in a more efficient and intuitive manner.

As described herein, a system for selecting and controlling target devices may enable an electronic device to select a target device for control based on detection of spatial information related to the electronic device (e.g., a control device that is carried or worn by the user) and/or based on spatial information related to the user. The spatial information can include detecting that a user or a control device is in a particular room (e.g., a room that includes one or more target devices), detecting a location/and or orientation of the user and/or control device relative to one or more target devices (e.g., left, right, center), and/or detecting a distance between the user and/or control device and one or more target devices.

In some examples, as described herein, a system or device may use detected spatial information to determine that a user is pointing at (or otherwise physically indicating) a target device(s). The system may use, for example, motion sensors, cameras, accelerometers, gyroscopes, infrared emitters/sensors, radio emitters/sensors, acoustic emitters/sensors, or other types of sensing devices to detect spatial information and determine a direction of user pointing.

In some examples, to determine when the user is pointing at a particular target device, a control device carried or worn by a user may include various sensors to enable determination of the location of the control device within the physical environment and the orientation of the control device with respect to target devices, along with detection of various user gestures. For example, a control device may include one or more sensors for obtaining distances of the control device from multiple stationary anchor devices and use the distance values to determine the location of the control device. The control device may also include one or more sensors for detecting and classifying various user gestures by detecting an orientation and/or motion of the control device. As described herein, the control device may use additional heuristics to determine whether the control device is pointed at a target device and if so, whether to remotely control the target device. For example, the control device may wait for user confirmation before remotely controlling a target device or may ignore certain gestures if the control device is operating in a context that indicates that the user is unlikely to be attempting to remotely control a target device (e.g., if the control device is being used for a phone call or is operating in a sleep mode).

In some examples, to detect when a user is pointing at a particular target device, the location of the user and/or gestures of the user may be detected using one or more cameras located near the user (such as in a room with the user), rather than (or in addition to) being detected by a control device worn by the user. For example, a user may point to a target device and the pointing may be detected by cameras within the room (e.g., whether or not the user is wearing or holding a control device).

In some examples, to detect when a user is pointing at a particular target device, a signal emitted by a control device (such as an infrared signal) in the direction of a target device may be detected by the target device. That is, the pointing may be detected based on a signal emitted by a control device. The target device may respond by transmitting, to the control device, an indication that it has detected the signal, thereby enabling the control device to determine the pointing direction based on the indication received from the target device.

In some examples, the system may enable a user to both select and control a target device based on physical gestures, without the use of a user interface or voice recognition. For example, a system may include camera devices that detect when a user is pointing at a target device and when a user has provided an input associated with control of a target device. Additionally or alternatively, a control device carried or worn by a user may detect when the user has pointed at a particular target device based on a location and orientation of the control device, and may select that target device for remote control. The control device may then detect a user gesture, such as a pinch gesture, swipe gesture, and/or release gesture, that is associated with an operation to be performed by the selected target device. Such an operation may include, for example, an on/off operation that causes the target device to turn on (if it is off) or turn off (if it is on) (e.g., an on/off toggle operation), a dimming operation that causes the target device (e.g., a light) to change its brightness, a volume change operation that causes the target device (e.g., a media player) to increase or decrease its playback volume, a play or pause operation that causes the target device (e.g., a media player) to play or pause content, or any other operation that a target device is capable of performing. For example, after pointing to a smart television, a user may make a pinching gesture that is detected by the control device. In response to the pointing and pinching, the control device may select the television as the target device and cause the television to be turned on. For example, a user can "pick" media playing on a first electronic device (e.g., by pointing at the first electronic device and making a pinch gesture, for example) and "place" the media on a second electronic device (e.g., by pointing at the second electronic device—optionally while maintaining the pinch gesture—and then making a release gesture). In this manner, a user can use the control device to select any appropriate target device to be remotely controlled and then provide gesture inputs to cause the target device to perform an operation (e.g., to turn on or off, to change volume, etc.) without requiring the use of physical input buttons, displayed user interfaces, voice recognition, or the like. Many other such variations of using gesture control to select and control electronic devices are possible.

In some examples, once a target device has been selected based on the detection of the pointing, the user may control the operation of the selected target device using a displayed user interface and/or using voice commands rather than using gesture control.

FIG. 1 illustrates an example system 100 for control of target devices based on detection of spatial information according to examples of the disclosure. In some examples, the spatial information indicates and/or is correlated with pointing. The example system 100 includes a control device 102 and multiple target devices 106, 108, 110, 112. In some examples, the control device 102 is an electronic device that can be used for remotely controlling the target devices 106, 108, 110, 112. In some examples, the target devices 106, 108, 110, 112 are configured to respond to control inputs (e.g., signals indicating an operation to be performed by the target device) from the control device 102.

In some examples, control device 102 can be a wearable or handheld device, but the disclosure is not so limited. FIG. 1 illustrates the control device 102 as a smart watch worn near a user's hand 104, such as on the user's wrist. A user wearing control device 102 may point at a target device by aiming control device 102 at a target device 106, 108, 110, 112, such as by raising their arm or pointing with their finger, for example. In the example of FIG. 1, the user has pointed their finger in the direction of target device 108 such that a portion of the control device 102 (such as a crown 105 of the control device 102) is aimed in the direction of target device 108 along projection 103 (e.g., projection 103 represents the pointing direction). The user need not necessarily point a finger at a target device 106, 108, 110, 112, however, to aim control device 102 at a target device 106, 108, 110, 112 along respective projections that intercept a target device 106, 108, 110, 112.

In some examples, control device 102 (and/or another device, such as a moderator device or target device described with reference to FIG. 2) can determine whether control device 102 is aimed at a particular target device 106, 108, 110, 112 by determining the location of control device 102 within the environment and determining the orientation of control device 102. For example, control device 102 may use the location and orientation of control device 102 relative to the (possibly predetermined) locations of target devices 106, 108, 110, 112 to determine whether control device 102 is aimed at a particular target device 106, 108, 110, 112. Control device 102 may determine its location as described with reference to FIGS. 2-8. To determine orientation, control device 102 may include one or more sensors (such as accelerometers, gyroscopes, inertial measurement units (IMUs), and/or other types of sensors) that enable control device 102 to determine its orientation (e.g., its translation, rotation, tilt, attitude, motion, etc.) within a reference coordinate system associated with the environment.

Different users may aim control device 102 at a target device 106, 108, 110, 112 by aiming different portions of control device 102 at the target device 106, 108, 110, 112. Such differences may reflect user preferences. For example, one user may aim control device 102 at a target device 106, 108, 110, 112 by aiming a side portion of the housing of control device 102 at the target device (e.g., such as by aiming the crown on a smartwatch at the target device 106, 108, 110, 112). Another user may aim control device 102 at a target device 106, 108, 110, 112 by aiming a top portion of the housing of control device 102 at the target device, such as a display portion of the housing of control device 102. Moreover, different users may wear control device 102 on different wrists (e.g., left or right). Because of these and other variations in how different users may aim control device 102 at target devices 106, 108, 110, 112, in some examples, control device 102 or another electronic device in communication with control device 102 may perform an initial calibration procedure to determine an orientation of control device 102 that corresponds to a user aiming control device 102. Such a calibration may include, for example, determining an orientation of control device 102 when a user aims control device 102 at a known target from different locations in the environment. An orientation of control device 102 determined using this type of calibration procedure may be referred to as a reference orientation. In some examples, control device 102 may subsequently (e.g., after calibration) determine whether a user has aimed control device 102 at a particular target device 106, 108, 110, 112 based in part on comparing the orientation of control device 102 with the reference orientation. In some examples, the user can set a preferred reference orientation or source of a projection from a setting of the control device 102.

Additionally or alternatively, when the control device 102 is handheld, the projection may originate from different portions of control device 102 depending on how the control device 102 is held. For example, the projection may originate from a first side (e.g., top side) of the control device 102 when the control device 102 is held in a first orientation (e.g., portrait orientation, where the top side faces away from the user), whereas the projection may originate from a second side (e.g., orthogonal to the first side) when the control device 102 is held in a second orientation (e.g., landscape orientation, where the second side faces away from the user). Thus, the reference orientation used to determine whether control device 102 is pointing at a target device 106, 108, 110, 112 may differ depending on how the user is holding the control device 102.

It is understood that using the index finger as a pointer and/or using a projection originating from the crown 105 to select a target device 106, 108, 110, 112 are merely examples. In other examples, a different projection originating from a different portion of control device 102 can be used, based at least in part on the aiming calibration described above. Additionally, although the user's index finger and projection 103 originating from crown 105 are shown parallel in FIG. 1, it is understood that a relationship between the orientation of control device 102 and the orientation of a body part (such as a finger or arm) can be determined (e.g., based on a calibration procedure) and used to provide the desired pointing experience.

That is, in some examples, the control device 102 can be calibrated to enable the use of a body part as a pointer, as depicted in FIG. 1. For example, the orientation of the pointer finger can be correlated with the orientation of the projection 103 originating from the control device 102. As a result of aligning the projection with the orientation of the pointer finger, control device 102 can provide a user with an experience of selecting a target device using the finger. For example, the user experiences that pointing the finger of hand 104 causes the control device 102 to select target device 108 as the target device.

In some examples, instead of (or in addition to) using the location and/or orientation of control device 102 to detect pointing at a target device, control device 102 may include an infrared transmitter that may be used to select a target device 106, 108, 110, 112. For example, a user may point an infrared transmitter of control device 102 in the direction of a desired one of the target devices 106, 108, 110, 112 and cause the control device to emit an infrared signal in the direction of the desired one of the target devices 106, 108, 110, 112, such as by providing an input to the control device 102. The target devices 106, 108, 110, 112 may include one or more infrared detectors that detect the infrared signal transmitted by the control device 102 and, in response to detecting the infrared signal, transmits an indication of the selection of the desired one of the target devices 106, 108, 110, 112.

In some examples, system 100 includes one or more camera devices 118 that may be used to detect pointing of a user toward a target device. In such embodiments, a user need not necessarily wear control device 102 to select a target device. System 100 may use camera device 118 to determine whether a user is pointing at a target device, such as by determining a projection 107 from the user's finger (or hand, arm, head, or other portion of the user's body). Camera device 118 and/or control device 102 may identify a selected target device based on the projection 107. In some examples, camera device 118 is included in target devices 106, 108, 110, 112 or in an anchor device such a described with reference to FIG. 2. In some examples, camera device 118 is a separate device.

In some examples, when target devices 106, 108, 110, 112 are close together, a target device 106, 108, 110, 112 is selected based on a distance threshold, such as by selecting the target device 106, 108, 110, 112 that is closest to the projection 103, 107. In some examples, a target device may be selected based on which target device has the smallest angle between the pointing direction (e.g., the projection) and the center of the target device.

In some examples, a target device may be selected based on zones 114, 116 (e.g., predefined two-dimensional or three-dimensional areas) surrounding target devices 106, 108, 110, 112 or otherwise associated with target devices 106, 108, 110, 112. For instance, a target device 106, 108,

110, 112 may be selected if it lies within and/or is associated with (e.g., has been configured to be associated with) a corresponding zone 114, 116 that is intersected by the projection 103, 107.

In some examples, control device 102 may be configured to associate a zone 114, 116 with one or more target devices such that when it is detected that the user and/or control device 102 is pointing at the zone (e.g., by determining that a portion of the zone 114, 116 is intersected by the projection 103, 107), the one or more associated target devices are selected. For example, a ceiling zone (e.g., an area of the ceiling) may be associated with one or more target devices (e.g., lights) such that when the user points at the ceiling zone, one or more target devices associated with the ceiling zone are selected. When the user subsequently provides a control input, the control device 102 may cause the one or more target devices associated with the ceiling zone to be turned on by transmitting a control signal that may include corresponding identifiers for each of the target devices. In some examples, a zone 114, 116 may be associated with one or more target devices that do not lie within the zone. For example, in FIG. 1, zone 116 may be associated with target devices 106, 108, and 110, such that pointing at zone 116 causes target devices 106, 108, 110 to be selected even though target devices 106, 108, 110 are not located within zone 116.

In some examples, if two or more target devices 106, 108, 110, 112 are close to each other (e.g., within 0.001, 0.01, 0.05, 0.1, 0.25, 0.5, 0.75, 1.0, or 1.5 meters of, measured center-to-center or edge-to-edge), or if, for example, the projections from control device 102 to two or more target devices 106, 108, 110, 112 are similarly close or overlapping, control device 102 may prompt the user to select a target device 106, 108, 110, 112, such as by issuing a visual, audible, or haptic request or by displaying a user interface from which the user can select the target device from among the two or more target devices. Control device 102 may then receive a user input indicating a selection of a particular target device 106, 108, 110, 112, such as by receiving an input on a user interface, detecting a gesture, or detecting an audible response.

Control device 102 and target devices 106, 108, 110, 112 can include various portable and non-portable electronic devices including, but not limited to, mobile phones, tablet computers, laptop or desktop computers, servers, smart hubs, wearable devices, media players, televisions, projectors, smart lights, smart appliances, speakers, headphones, earphones, smart blinds, smart outlets, health care devices, etc. In some examples, some of the target devices 106, 108, 110, 112 may not be smart devices, but may be connected to an intermediate smart device (e.g., a lamp or blinds plugged into a smart outlet).

In some examples, virtual target devices can be presented to a user (e.g., in a virtual reality setting) to represent target devices that may or may not be otherwise visible. Such virtual target devices can be controlled in a similar manner as physical target devices.

Figure 2:
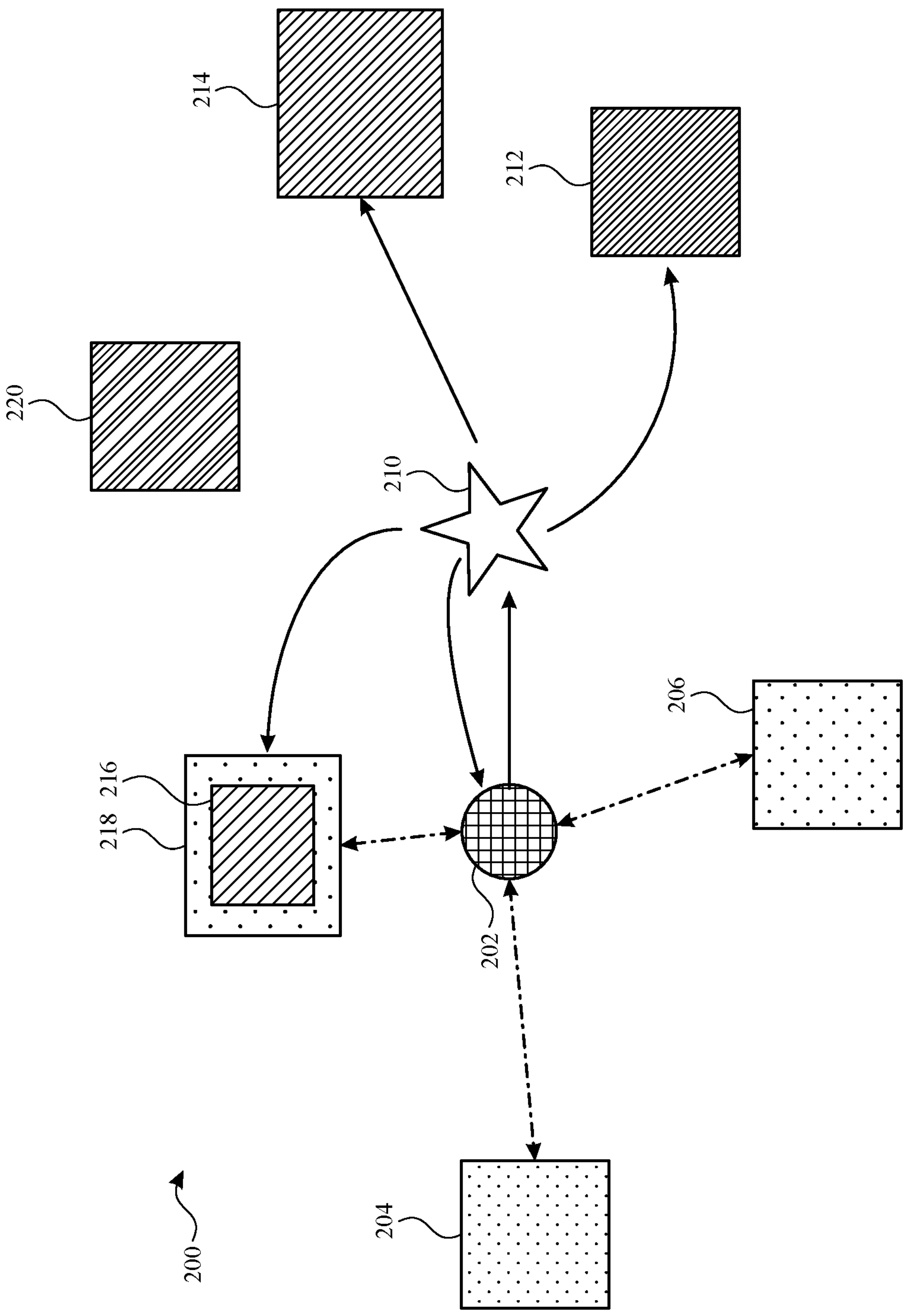
FIG. 2 illustrates an example system for control of devices based on detection of spatial information according to examples of the disclosure.

FIG. 2 illustrates an example system 200 for control of devices based on detection of spatial information according to examples of the disclosure. System 200 includes multiple electronic devices 202, 204, 206, 208, 210, 212, 214, 216, 218, 220. The electronic devices optionally include a control device 202 (e.g., corresponding to control device 102), multiple target devices 212, 214, 216 (e.g., corresponding to target devices 106, 108, 110, 112), multiple anchor devices 204, 206, 208, one or more camera devices 220, and a moderator device 210. Moderator device 210 may be physically or conceptually included in control device 202, in a target device 212, 214, 216, or in an anchor device 204, 206, 208, or may be a separate device. For example, moderator device 210 may be a separate device that offloads some of the processing associated with determining a location of control device 202 and communicating with target devices 212, 214, 216. In other examples, control device 202 performs these functions itself, and there is no separate moderator device 210. Thus, descriptions of the functionality of moderator device 210 may, in some cases, apply to control device 202 if control device 202 includes some or all of the moderator functionality. Likewise, descriptions of the functionality of control device 202 may, in some cases, apply to moderator device 210 if moderator device 210 includes some or all of the control device functionality.

In some examples, one or more camera devices 220 (which may be standalone devices or integrated into the other electronic devices described herein) may be used to detect a pointing direction of a portion of a user, such as detecting when a user is pointing a hand or finger at a target device or zone. After detecting a direction of user pointing, the camera devices 220 may transmit one or more signals to control device 202 indicating the direction of user pointing and/or indicating a target device or zone at which the user is pointing, and control device 202 may select one or more target devices based on the signal(s) received from the camera devices 220.

In some examples, control device 202 may be used to indicate and/or detect when a user is pointing at a target device or zone. For example, control device 202 may emit an infrared signal in a direction of a particular target device that includes an infrared sensor. The target device may detect the infrared signal, and in response to detecting the infrared signal, transmit a signal to control device 202 indicating that the target device has been selected.

Alternatively, control device 202 may be used to detect when a user is pointing at a target device or zone by determining the location and orientation of the control device 202 relative to target device(s) using signals from anchor devices 204, 206, 208. Anchor devices 204, 206, 208 within the physical environment can act as location references to determine or track the location of control device 202 within the physical environment. In some examples, control device 202 and anchor devices 204, 206, 208 are configured to perform ranging detection to enable determination of a location of control device 202. For example, control device 202 may emit a ranging signal that is detected by anchor devices 204, 206, 208, each of which may receive the ranging signal at a different time (e.g., may have a different time of arrival) based on the relative distances of anchor devices 204, 206, 208 from control device 202. Based on the time of arrival of the ranging signal, each anchor device 204, 206, 208 may determine a distance of control device 202 from the anchor device 204, 206, 208. Anchor devices 204, 206, 208 may each transmit an indication of the distance of control device 202 from the respective anchor device 204, 206, 208, and control device 202 may then use the respective transmitted distance values to determine the location of control device 202 within the physical environment. Other types of ranging techniques may be used. In some examples, an anchor device or target device can also serve as a moderator device.

In some examples, control device 202 may not determine its own location, and may instead transmit distance values received from anchors 204, 206, 208 to moderator device 210 (e.g., if moderator device 210 is separate from control device 202). Moderator device 210 may then determine the location of control device 202 within the environment based on the received distance values. In some examples, control device 202 and anchor devices 204, 206, 208 may exchange ranging signals using ultra-wideband (UWB) signals, which may have the advantage of not interfering with other nearby communication protocols (e.g., WiFi) and being at least partially transmissible through obstacles (e.g., walls). Techniques for obtaining a location of control device 202 based on distance (ranging) information received from anchor devices 204, 206, 208 are described in more detail with reference to FIGS. 5 and 6.

As shown in FIG. 2, a single device can serve as both an anchor device 208 and a target device 216 (e.g., including both target and anchor functionality). For example, a smart television may be a target device, but the smart television may also be an anchor device for determining the location of the control device. In a similar manner, a smart hub, smart light, or smart speaker can be a target device and/or an anchor device. In some examples, a control device 202 could be a target device of another control device. In some examples, a target device and/or an anchor device can include a camera device 220.

The location and orientation of control device 202 relative to a target device 212, 214, 216 can be used to determine that a projection from a portion of control device 202 is pointing at a particular target device 212, 214, 216 (and/or not at other respective target devices). In some examples, because control device 202 can control multiple target devices 212, 214, 216, each of which may be configured to receive signals broadcast by control device 202, control device 202 may notify a selected target device 212, 214, 216 that it is being targeted for a control input, such as by transmitting an identifier of the target device 212, 214, 216 before or in conjunction with transmitting a control input. In some examples, moderator device 210 communicates such identifier information to the target device 212, 214, 216 based on location and orientation information received from control device 202. In some examples, control device 202 (or moderator device 210) uses the location and/or orientation of control device 202 to select a particular target device 212, 214, 216 without the user providing additional inputs to identify the target device 212, 214, 216.

In some examples, after selecting a target device 212, 214, 216, control device 202 may issue an alert to notify the user that a target device has been selected. Such an alert may help avoid unintentional remote control of target devices 212, 214, 216. The alert may include a haptic alert, an audible alert, a visual alert, or a combination of these. Optionally, control device 202 may then wait (e.g., for a pre-determined period of time, such as 0.1-10 seconds) to receive a confirmation input from the user indicating that the user intended to select a target device 212, 214, 216 for remote control. The confirmation input may be a dwell time (such as 0.1-10 seconds) in which the user maintains the pointing or aiming gesture, a separate gesture detected by control device 202, or another type of input, such as a button press on control device 202 or a verbal confirmation. If an (optional) confirmation input is received, control device 202 may then control the operation of the target device as described below. If an (optional) confirmation input is not received within the pre-determined period of time (or if an input that does not correspond to a confirmation is received, such as a termination gesture or verbal termination request), control device 202 may "unselect" the target device and may ignore a subsequent gesture associated with an operation of the target device 212, 214, 216.

In some examples, additionally or alternatively, a selected target device 212, 214, 216 may issue an alert to notify the user that the target device has been selected. Such an alert may be haptic, audible, or visible.

In some examples, control device 202 can be used to control the operation of a target device 212, 214, 216 based on detection of various user gestures that are associated with operations of a target device. Such gestures may include, for example, an arm and/or hand raise, a pointing gesture, a clench (of the fist), a double clench (of the fist), a pinch (of two fingers), a double pinch (of two fingers), a pinch of multiple fingers, a snap (of two fingers), or other types of gestures. Some of these gestures may include movement (e.g., raise, translation, rotation, etc.) of control device 202, optionally while maintaining an input (e.g., a wrist rotation while maintaining a pinch) and/or can also include a release of the gesture (e.g., releasing a clench or a pinch). For example, a wrist rotation input may be used to indicate an amount by which the operation of a target device is to be changed, such as by indicating a progressive change in playback volume or dimming amount (e.g., as though the user is rotating a physical dial).

In some examples, the gestures can be detected by one or more camera devices 218, which may then transmit one or more signals to control device 202 indicating the detected gestures. In some examples, the gestures can be detected by control device 202 using one or more sensors in control device 202. Such sensors may include, for example, an accelerometer, a gyroscope, an IMU, a magnetometer, and/or a photoplethysmography (PPG) sensor (to detect blood volume changes or other physiological changes associated with hand gestures).

In some examples, a particular gesture may be associated with a particular operation to be performed by the target device 212, 214, 216. For example, a pinch gesture may be associated with turning a device on or off, while a wrist rotation or slide type gesture (e.g., on a trackpad, touch screen, or in free-space while maintaining a pinch of two fingers) may be associated with controlling (e.g., changing) a volume on a television or dimming of a light. The association of the gesture with the operation to be performed by the target device may depend on the type of target device, and specific gestures may be associated with specific operations that may be factory predefined or programmable (e.g., set or selected by the user). In some examples, control device 202 may detect a gesture or receive an indication of a gesture (e.g., from camera device 118, 220, identify an operation associated with the gesture, and transmit a control input to the target device (e.g., broadcast the control input) indicating the operation to be performed. The control input may include an identifier of the selected target device(s). In some examples, control device 202 may detect a gesture and transmit information about the gesture to moderator device 210, and moderator device 210 may identify the associated operation and transmit the corresponding control input.

Figure 3:
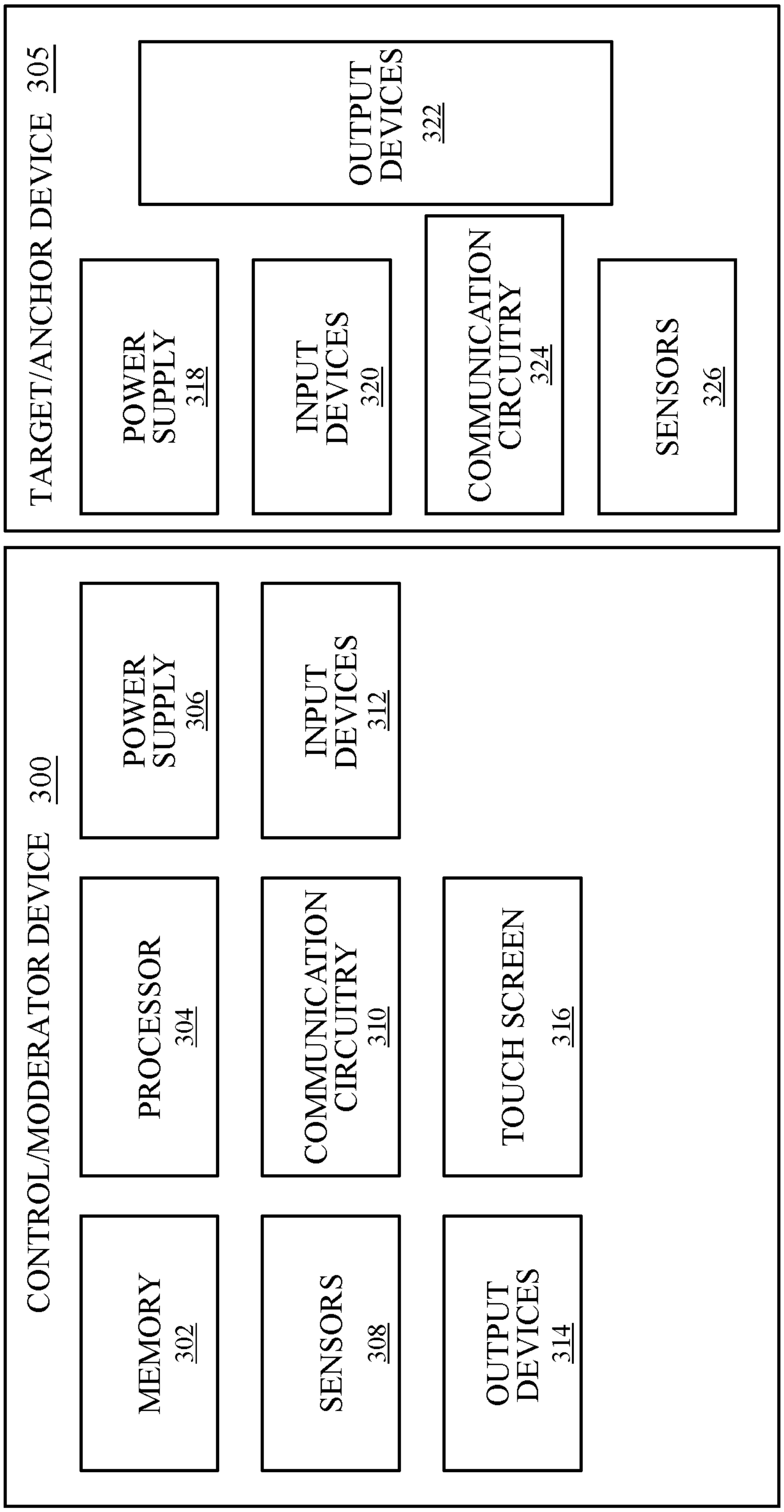
FIG. 3 illustrates a block diagram of a control and/or moderator device and a target and/or anchor device according to examples of the disclosure.

FIG. 3 illustrates a block diagram of an example control or moderator device 300 and an example target or anchor device 305 according to examples of the disclosure. Control/moderator device 300 includes memory 302, a processor 304, a power supply 306 (e.g., a battery or a connection to an external power supply, etc.), one or more sensors 308, communication circuitry 310 (e.g., wired or wireless), input devices 312 (e.g., buttons, crown, a microphone, etc.), output devices 314 (e.g., speakers, haptic feedback generator, etc.), and a touch screen 316.

Target/anchor device 305 optionally includes a power supply 318 (e.g., battery, or wired to external power supply, etc.), output devices 322, input devices 320, communication circuitry 324, and one or more sensors 326. Some target/anchor devices 305 may include a subset of these elements or additional elements depending on the functionality of the target/anchor device 305.

Processor(s) 304 can be configured to perform the processes described herein. Processor(s) 304 include one or more general processors, one or more graphics processors, and/or one or more digital signal processors. In some examples, memory 302 is a non-transitory computer-readable storage medium (e.g., flash memory, random access memory, or other volatile or non-volatile memory or storage) that stores computer-readable instructions (e.g., programs) configured to be executed by processor(s) 304 to perform the processes described herein. In some examples, memory 302 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages, such as magnetic disks, optical discs based on CD, DVD, or Blu-ray technologies, as well as persistent solid-state memory such as flash, solid-state drives, and the like.

One or more sensors 308, 326 can include previously mentioned sensors, such as accelerometers, gyroscopes, IMUs, magnetometers (e.g., a compass), PPG sensors, UWB sensors, etc. One or more sensors 308 can also optionally include one or more visible light image sensors, such as charged coupled device (CCD) sensors and/or complementary metal-oxide-semiconductor (CMOS) sensors operable to obtain images of physical objects. In some examples, one or more sensors 308, 326 also include one or more infrared sensors, such as a passive or active infrared sensor, configured to detect infrared light. For example, an active infrared sensor includes an emitter configured to emit infrared light. One or more sensors 308, 326 also optionally include one or more cameras configured to capture movement of physical objects, such as movement of a user. One or more sensors 308, 326 can also optionally include one or more depth sensors configured to detect the distance of physical objects from the electronic device. In some examples, control/moderator device 300 and target/anchor device 305 use a combination of CCD sensors, infrared sensors, and depth sensors to detect and/or map the physical environment around the control/moderator device 300, such as by mapping the locations of anchor devices, target devices, obstacles, etc.

Communication circuitry 310, 324 optionally includes circuitry for communicating with other electronic devices, networks (e.g., the Internet), intranets, a wired network, a wireless network, a cellular network, a wireless local area network (LAN), etc. Communication circuitry 310, 324 optionally includes circuitry for communicating using UWB (e.g., for communications between a control device and anchor devices), near-field communication (NFC), and/or short-range communication (e.g., Bluetooth®).

Figure 4:
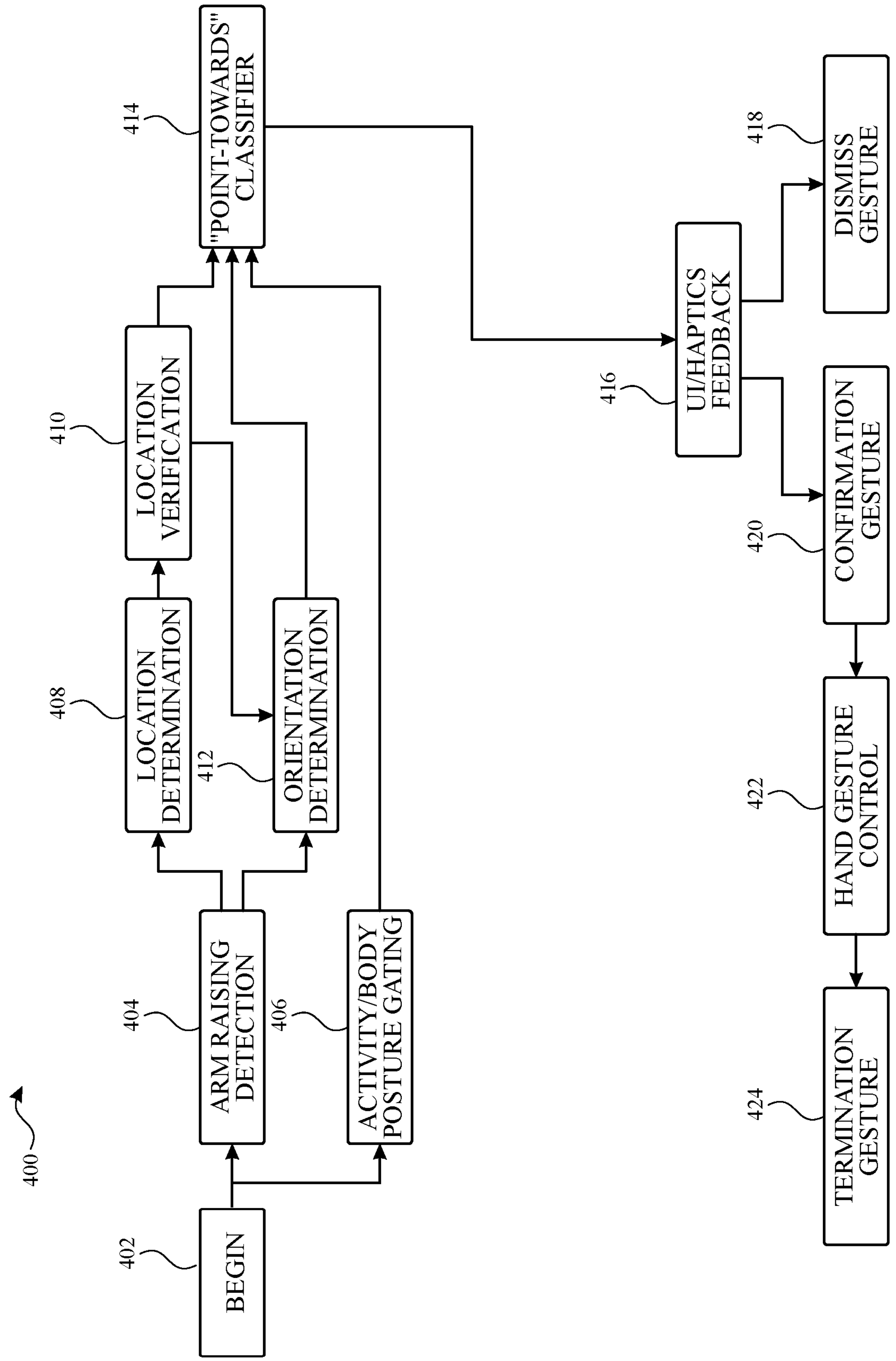
FIG. 4 illustrates an example flowchart of control logic of a system for control of devices based on detection of spatial information according to examples of the disclosure.

It is understood that control/moderator device 300 and target/anchor device 305 are not limited to the components and configuration of FIG. 3, but can include fewer, other, or additional components in multiple configurations. FIG. 4 illustrates an example flowchart of control logic of a system for control of devices based on detection of spatial information according to examples of the disclosure. FIG. 4 illustrates a process 400 for identifying that a control device (e.g., control device 102, 202) and/or a portion of a user is pointing at a target device (e.g., target device 106, 108, 110, 112, 212, 214, 216) or a zone (e.g., zone 114, 116). Process 400 may be performed by a system (e.g., system 100, 200).

The process 400 begins at 402. In some examples, a control device or camera device, can detect characteristic movements, activities, or postures correlated with pointing (or not correlated with pointing) to detect that a control device or a portion of a user is pointing at a target device or zone. For example, at block 404, the system (e.g., system 100, 200) can detect a first gesture of an arm raising (e.g., using cameras, motion and/or orientation sensors, such as an IMU, accelerometer, etc.), which is correlated with using the hand to point to a target device or zone to select one or more target devices. In some examples, a target device can detect an infrared signal emitted by a control device that indicates that the control device is pointed at the target device.

Optionally, to avoid false positives, at block 406 the system can identify a user context that may be used to help determine if the gesture detected at block 404 should be interpreted as a user request to remotely control one or more target devices. For example, the system can determine whether the control device is operating in a sleep mode, or the user is making a phone call. A first type of context may suggest that the user does not wish to perform remote control of target devices (e.g., in spite of the detection of the first gesture at block 404). For example, the first type of context may include a context in which the user is performing certain activities during which the user is unlikely to wish to remotely control a target device, such as when making a phone call, or when the control device is operating in a particular mode, such as a sleep mode.

In some examples, gesture control of target devices may be undesirable (and the feature can optionally be disabled) when the control device, camera device, and/or motion sensor device detects that the user's arm is posed in certain postures (e.g., that a pose of the user meets certain criteria), such as resting on a surface, pointing to the ground, or performing high frequency movement (e.g., rapid arm swings). Thus, determining the user context at block 406 can additionally or alternatively include determining a pose of the user.

Optionally, at block 408, various sensors can be used to estimate the location of the control device. For example, UWB sensors can be used for ranging and trilateration techniques as described with reference to FIGS. 5 and 6 and can be used to estimate the location of the control device in the environment relative to anchor devices, target devices, and/or zones.

In some examples, the ranging signals may be received asynchronously. In some examples, to save power and reduce processing requirement, detection of the arm raising (or other gesture associated with selection of a target device for remote control) can trigger the sensing by the ranging and motion and/or orientation sensors; e.g., by triggering collecting (e.g., sampling) of new ranging, motion, and orientation data. In some examples, the detection of the arm raising triggers sensing by some of the sensors (e.g., UWB, magnetometer, etc.), but other sensors may operate independently of the detection of the arm raising (e.g., accelerometer and gyroscope); that is, the accelerometer and gyroscope may collect sensing data in an ongoing manner to monitor the motion and orientation of the control device. In some examples, to save power and reduce processing requirements, detection of the arm raising can trigger processing of previously sampled data from the ranging and motion and/or orientation sensors to determine location and orientation of the control device.

Optionally, at block 410, the estimated location of the control device determined at block 408 can be verified to determine whether the estimated location is acceptable (e.g., sufficiently accurate), using heuristics and/or by determining an error associated with the estimated location. If the error is acceptable, the estimated location may be used as the location of the control device in subsequent processing (e.g., in blocks 412 and 414). If the estimated location is not acceptable, various techniques may be used to adjust the estimated location, such as described with reference to FIGS. 6 and 8. For example, the system may collect new distance values from the anchor devices and recompute the location of the control device or may obtain additional information (such as angle of arrival information) to adjust the estimated location of the control device.

Optionally, at block 412, the system may determine the orientation of the control device, such as by using one or more motion and/or orientation sensors (accelerometer, gyroscope, IMU, magnetometer, etc.). The operations of block 412 may occur in parallel with block 408, or the two operations may occur at different times. Optionally, the location determined at block 410 may be used to help determine the orientation of the control device 402.

At block 414, the system can determine whether the user is pointing to or aiming a control device toward a specific target device or zone. In some examples, the determination at block 414 is made using a classifier. In some examples, the inputs to the classifier include the outputs of blocks 406, 408, 410, and/or 412. For example, the classifier may determine a probability that the location and orientation of the control device (and, optionally, the type of user context as received from block 406) indicates that the user is pointing to or the control device is aimed at a particular target device or zone. For instance, the classifier can make this determination based on a threshold probability and determine a "yes" or "no" value. In some examples, the classifier can have a maximum value for the threshold probability and/or a user could select the maximum value that meets a minimum threshold probability. In some examples, the classifier could utilize various techniques such as machine learning and/or neural networks, which can be trained based on inputs received from the various devices. In some examples, the classifier may determine whether the user is pointing to or aiming the control device toward a specific target or zone based on a distance of the user or the control device from the target device or zone and/or whether or not the user is already pointing at the target device or zone (e.g., as a form of hysteresis, such that the system does not repeatedly identify a target device or zone based on an input that has changed very little, such as when the user changes the pointing direction slightly but is still pointing at the same target device or zone).

In some examples, at block 416, if the system determines that the user or control device is pointing at a target device or zone, the system provides feedback to the user to notify the user that one or more target devices have been selected. In some examples, the feedback can include audio, visual, and/or haptic feedback. For example, a control device may provide an audio output (e.g., beep, tone, spoken notification) using speakers of the control device to indicate pointing at a target device. In some examples, a control device may provide a visual output (e.g., flashing light, solid light, written notification) using light emitting components (e.g., LEDs, display) of the control device indicating pointing at a target device or zone. In some examples, a control device may provide a haptic output (e.g., vibration) using haptic output circuitry of the control device indicating pointing at a target device or zone. Additionally or alternatively, in some examples, a target device at which the user or control device is pointing (or target device(s) associated with a zone at which the user or control device is pointing) may provide audio, visual, and/or haptic feedback. In some examples, a user interface displayed on the control device (or on the target device(s)) visibly changes to provide the feedback.

After providing the feedback at block 416, the system may, optionally, wait for a user confirmation input. In some examples, the user may provide a confirmation input to confirm (at block 420) selection of one or more target devices or provide a dismissal input (at block 418) to dismiss (e.g., terminate) the identification of the one or more target devices for gesture control. In some examples, the confirmation input may include a dwell time; e.g., a time duration during which the user continues to point at the target device for a threshold period of time (e.g., 0.1-10 seconds), and/or could be an additional gesture control such as a pinching. In some examples, the system does not wait for a confirmation gesture and instead proceeds to block 422.

If the system receives a confirmation input at block 420 (or if the system does not wait for a confirmation input) then at block 422 the system may detect one or more additional user inputs (e.g., gestures such as pinches, selection of an operation from a user interface of the control device, and/or a verbal input) to control the operation of the target device.

In some examples, to terminate the control interaction with the target device(s), a user provides a termination input at block 424. In some examples, the termination input is a hand gesture, such as pointing away from the target device, pinching, releasing a pinch, or the like. In some examples, the termination gesture is detected (e.g., by the control device, camera device, and/or motion sensor device) as an arm raising or lowering, a relatively fast movement, a time out, or a combination of those. In some examples, the steps of FIG. 4 are performed in various ways and/or orders.

Figure 5A:
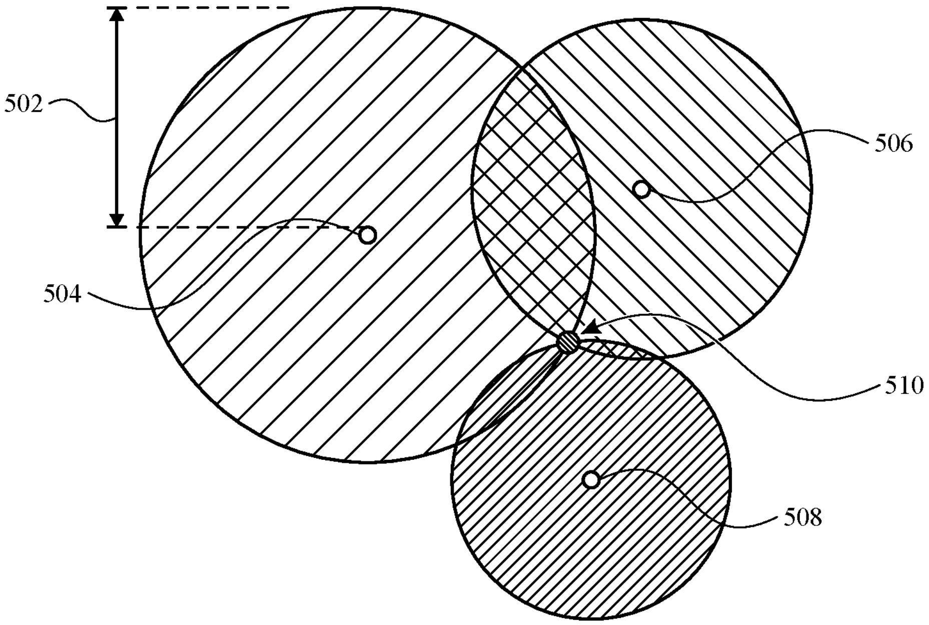
FIGS. 5A-5B illustrate examples of determining a location of a control device of a system for control of devices based on detection of spatial information according to examples of the disclosure.
Figure 5B:
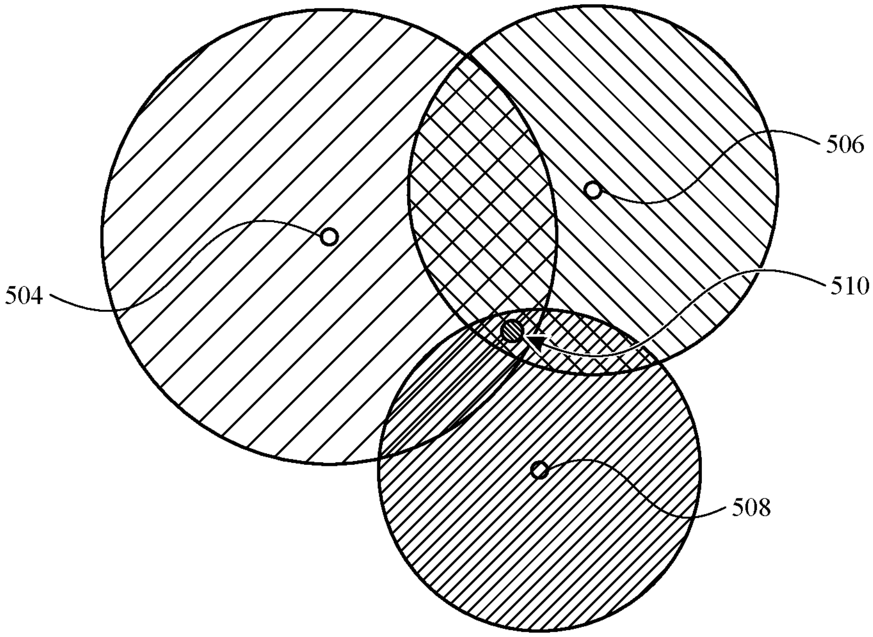

FIGS. 5A-5B illustrate examples of determining (or estimating) a location of a control device in a system for performing control of devices based on detection of spatial information. In these figures, three anchor devices 504, 506, 508 are used to determine a location of a control device 510, as follows.

FIG. 5A illustrates an ideal scenario in which the location of control device 510 can be exactly determined using trilateration based on distance measurements from three anchor devices 504, 506, 508. Each anchor device 504, 506, 508 can determine a distance between itself and control device 510 based on a time of arrival of a signal received from control device 510 (such as an optical, acoustic, or radio UWB signal). This distance describes a radius 502 of a circle (or sphere, in three dimensions) centered around the anchor device 504, with control device 510 located somewhere along the perimeter of the circle. That is, the perimeter of each circle depicted in FIG. 5A characterizes the possible locations of control device 510 relative to each anchor device based on the distance determined by each anchor device 504, 506, 508. In the ideal case shown in FIG. 5A, the three circles intersect at a single point, which can be used as the location of control device 510. This may not always be the case, however, primarily due to distance measurement errors.

FIG. 5B illustrates a more typical (non-ideal) scenario, in which the three circles associated with anchor devices 504, 506, 508 do not intersect at a single point, and instead circumscribe an area in which control device 510 is likely to be located. Control device 510 may estimate its location based on the distance values received by the anchor devices, 504, 506, 508 such as estimating its location to be in the center of the circumscribed area.

In some examples, if the area in which control device 510 may be located is too large (e.g., there is too much measurement error in one or more of the distances determined by the anchor devices 504, 506, 508), control device 510 may re-determine its location (e.g., based on new distance values from the anchor devices 504, 506, 508), or may adjust its estimated location by using additional information. In some examples, as described with reference to block 410 of FIG. 4, control device 510 may use various heuristics to determine whether the estimated location of control device 510 is acceptable. For example, control device 510 may compare its estimated location with one or more previously determined locations of control device 510 to determine whether the estimated location is sufficiently accurate. For example, control device 510 may determine whether the error associated with its current estimated location is acceptable based on whether the distance traveled by control device 510 from one or more previously determined locations is too large (e.g., would require the control device 510 to be traveling at an unrealistic velocity), or whether the path between one or more previously determined locations and the current estimated location traverses an obstacle, such as a wall, furniture, etc. Such indicators may be used by control device 510 to identify inaccurate location measurements and take corrective action (e.g., by re-determining the estimated location based on new distance values received from the anchors, or by adjusting the estimated location based on additional information, such as described with reference to FIG. 6).

Figure 6:
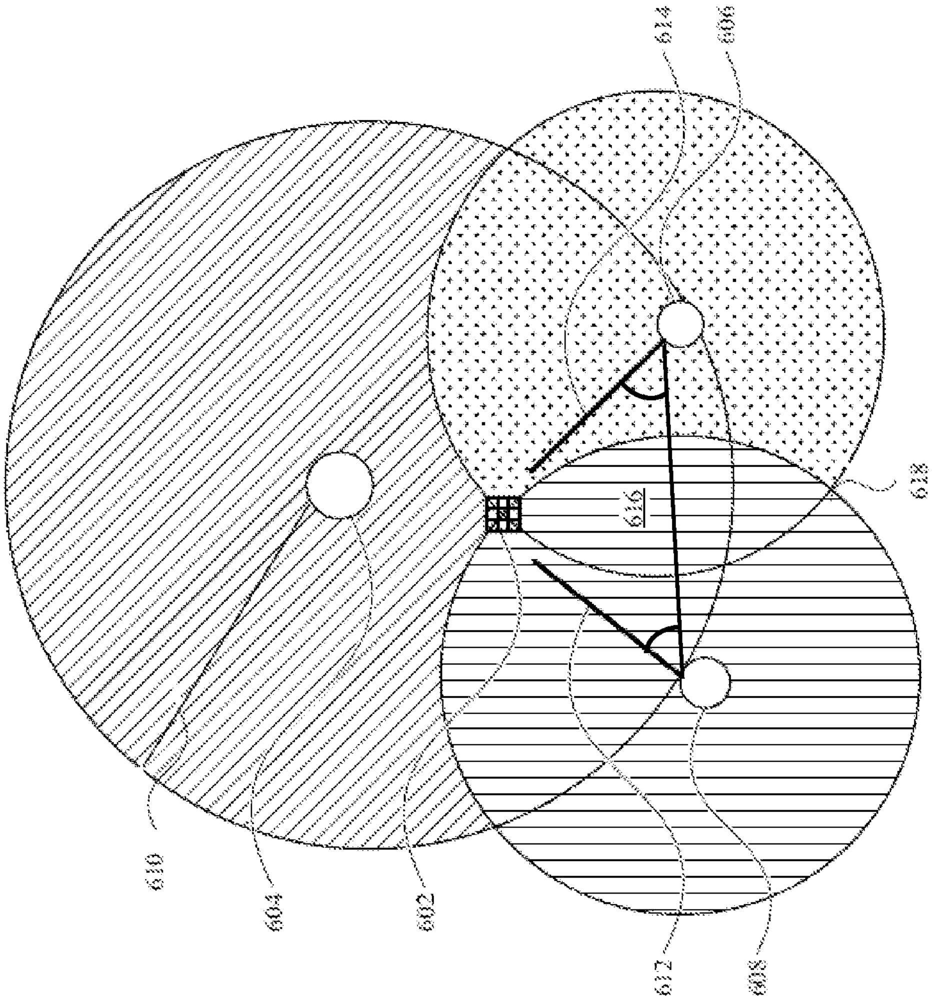
FIG. 6 illustrates an example of determining a location of a control device of a system that can perform control of devices based on detection of pointing according to examples of the disclosure.

FIG. 6 illustrates a scenario in which the error in the estimated location of control device 602 is unacceptable (e.g., because the area 616 in which control device 602 may be located is too large). In this case, the circles determined by two of the anchor devices 606, 608 (which each describe possible locations of the control device 602 relative to the respective anchor device 606, 608) intersect with each other at two locations: the actual location of control device 602, and a second location 618 away from control device 602. Thus, based on the distance values received from anchor devices 606, 608, control device 602 may not be able to accurately determine its location. The circle from the third anchor device 604 indicating possible locations relative to the third anchor device 604 cannot be easily used to disambiguate the location of control device 602, because the circle from the third anchor device 604 has an erroneously large radius 610 and therefore intersects with the other two circles relatively far away from both of the intersection points defined by the anchors 606, 608, thereby defining an area 616 that may be too large to accurately determine the location of control device 602. Such a scenario may occur when one of the anchor devices (e.g., anchor device 604) determines its distance from control device 602 as being larger than is accurate, thus generating a circle of possible locations with a larger radius 610 than is accurate. Such mismeasurement may occur when control device 602 is occluded from the anchor device 604, such as when it is occluded by the user's body. In this case, control device 602 may use additional information to determine its position, such as using the angle of arrival 614 of anchor device 606 and/or the angle of arrival 612 of anchor device 608 to determine the location of control device 602 and/or adjust the estimated location of control device 602. In this case, the two angles of arrival 612, 614 both "point" at the location of control device 602 rather than at second location 618 or elsewhere in the circumscribed area 616.

Figure 7:
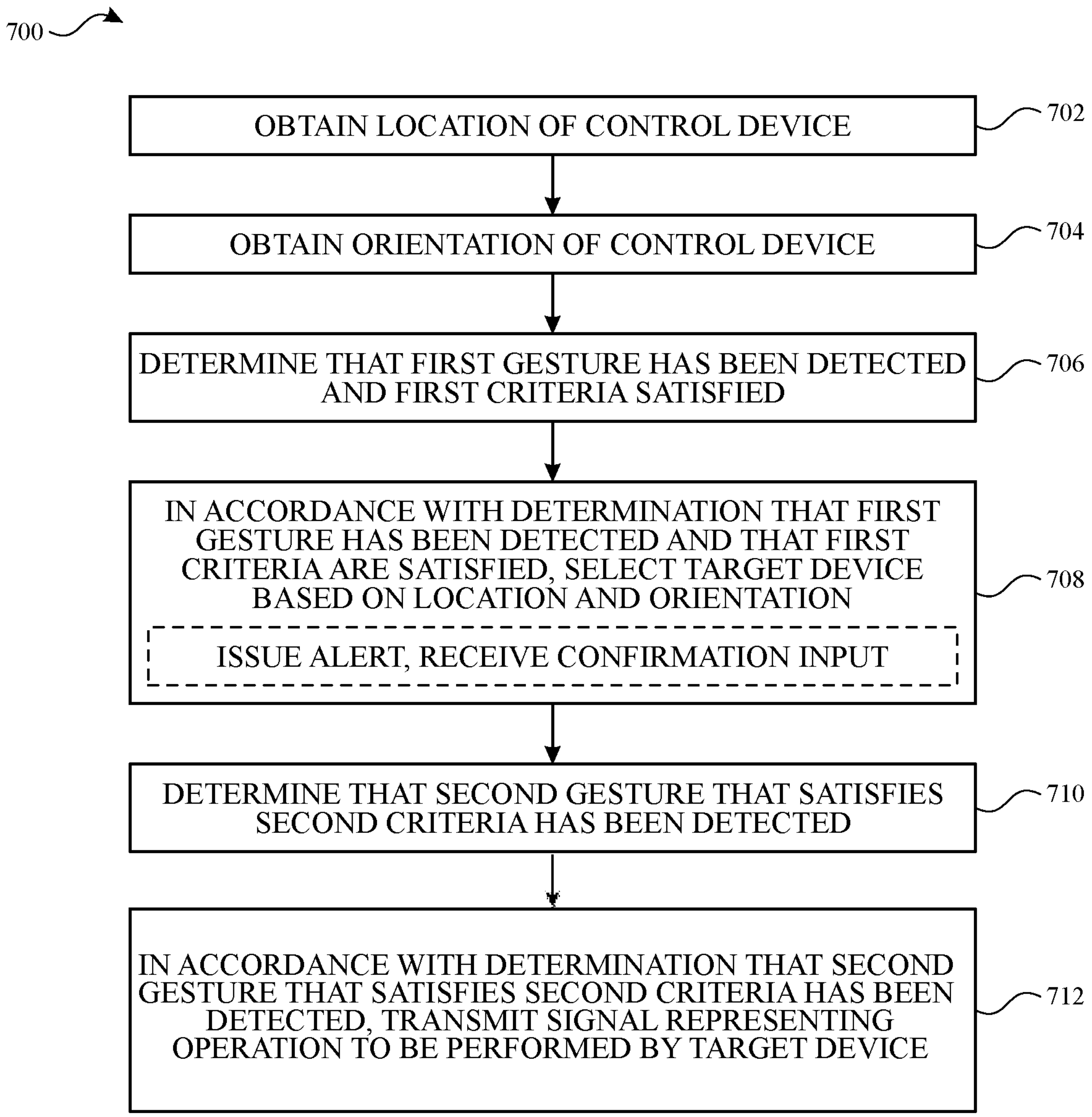
FIG. 7 illustrates an example flowchart for remote control of target devices based on detection of spatial information.

FIG. 7 illustrates an example flowchart of a method 700 for control of devices based on detection of pointing according to some embodiments of the disclosure. The method 700 can be performed by a control device (e.g., control device 102, 202), or by a moderator device (e.g., moderator device 210), or by a combination of these devices. Some of the operations in method 700 can be optionally combined or omitted, and the order of some operations can be optionally changed. Some of the operations in method 700 can be performed more than once, sequentially, or in parallel.

As described herein, method 700 provides an efficient way for a user to remotely control one or more target devices using gestures rather than using a single-device dedicated remote controller, a touch screen, or voice recognition. In some examples, the control device may be worn on the user's body (e.g., on their arm, wrist, or hand) and may enable the user to remotely control multiple target devices simply by making various gestures, without having to retrieve another device. In other examples, the control device may be any device that a user typically holds or operates for other purposes, such as a smart phone, and conveniently enables the user to use the device for remote control.

At block 702, a location of a control device is obtained. In some examples, the location of the control device may be obtained based on distance information received from multiple anchor devices. In some examples, an estimated location of the control device may be obtained based on distance information received from the anchor devices and may be adjusted to obtain the location of the control device based on additional information, such as angle of arrival information from the anchor devices. In some examples, the control device may obtain its own location based on the received distance information. In other examples, the control device may receive the distance information from the anchor devices and transmit the distance information to a separate moderator device, and the moderator device may obtain the location of the control device based on the distance information.

At block 704, the control device may obtain an orientation of the control device (e.g., using on-board sensors). Optionally, the control device may transmit orientation information to a moderator device.

At block 706, the control device may determine that a first gesture has been detected and that one or more first criteria have been satisfied. The first gesture may be detected by the control device based on, for example, sensor signals from sensors on the control device, such as an accelerometer, IMU, gyroscope, etc. The first gesture may include an arm raise, a pointing gesture, or another type of gesture. The first criteria may include criteria that are satisfied when the user context is not a first type of context, for example.

At block 708, in accordance with the determination that the first gesture has been detected and the first criteria are satisfied, the control device may select one or more target devices based on the location obtained at block 702 and the orientation obtained at block 704. In some examples, a moderator device may select the one or more target devices based on the location and orientation of the control device.

Optionally, the control device may, after detecting the first gesture and selecting a target device, issue an alert to notify the user that a target device has been selected. The alert may be a haptic alert, an audible alert, or a visible alert, for example. Optionally, the control device may receive a confirmation input, such as a dwell time, gesture, button input, or verbal confirmation, indicating that the user confirms the selection of one or more target devices.

At block 710, the control device may determine that a second gesture that satisfies one or more second criteria has been detected. In some examples, the second criteria may include a criterion that is satisfied when the second gesture occurs within a pre-determined time duration of the detection of the first gesture; when the second gesture occurs after receiving a confirmation input from the user; and/or when the second gesture is a gesture is associated with an operation of the target device(s).

In some examples, the second gesture may be different than the first gesture. For example, the first gesture may be an arm raise or point, and the second gesture may be a pinching gesture or another type of gesture. In some examples, the second gesture may be associated with an operation to be performed by the selected target device. Optionally, the control device may transmit an indication of the second gesture to a moderator device.

At block 712, in accordance with a determination that the second gesture that satisfies the second criteria has been detected, the control device may transmit a signal representing an operation to be performed by the target device(s) to remotely control the target device(s). In some examples, the operation is associated with the second gesture. In some examples, the signal includes one or more corresponding identifiers of the target device(s) (e.g., each identifier corresponds to a particular target device). In some examples, a moderator device may receive an indication of the second gesture and may transmit a signal representing an operation to be performed by the target device(s) based on the indication of the second gesture.

Figure 8:
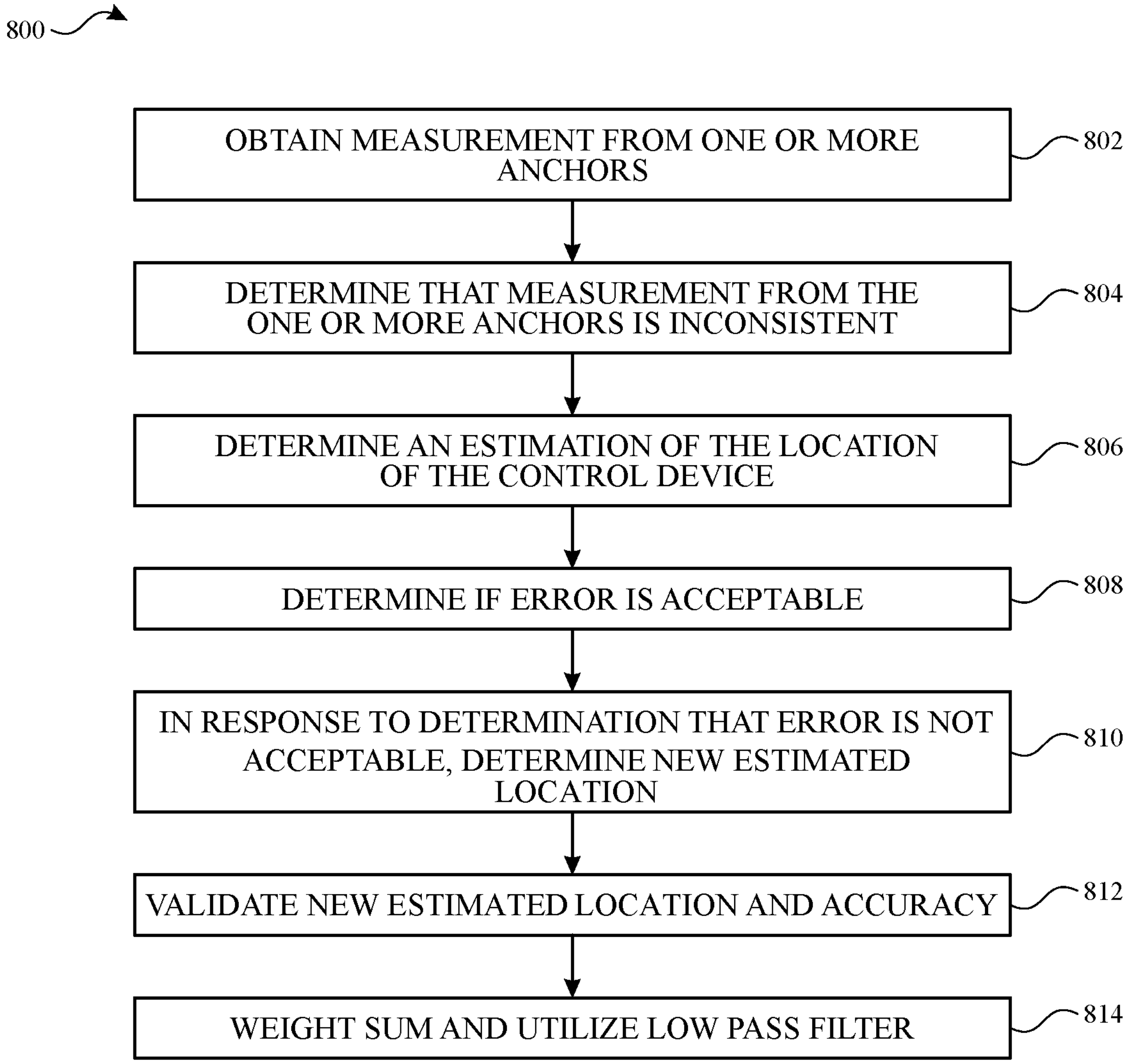
FIG. 8 illustrates an example flowchart for remote control of target devices based on detection of spatial information.

FIG. 8 illustrates an example flowchart of a method 800 of adjusting an estimated location of a control device in a system for control of devices based on detection of pointing according to examples of the disclosure. The blocks of FIG. 8 may be performed by a control device (such as control device 102, 202), by a moderator device (such as moderator device 210), or by a combination of these devices.

At block 802, distance measurements are obtained from one or more anchor devices. In some examples, one or more anchor devices determines the anchor device's respective distance from a control device using one or more sensors (e.g., UWB sensors), and transmits a corresponding distance measurement to the control device. In some examples, the distance measurements are received asynchronously from the anchor devices, and the most recent distance measurement from each anchor device is used in subsequent location estimation. Distance measurements that are too old (e.g., were received more than a threshold amount of time before the location is estimated) may be ignored. Optionally, the control device may then transmit the distance measurements to a moderator device.

In some examples, an angle of arrival between the anchor device and the control device may be determined (e.g., an angle that characterizes a direction of a path from the anchor device to the control device). Optionally, the control device may then transmit the angle of arrival measurement(s) to a moderator device.

At block 804, it is optionally determined that one measurement from an anchor device is inconsistent with measurements from other anchor devices. In some examples, the anchor devices or the control device compares respective distance measurements from the anchor devices to determine that there is one or more outlier distance measurement that is inconsistent with the other distance measurements. For example, a control device may determine that a distance measurement from an anchor is an outlier if it is significantly larger or smaller than expected relative to distance measurements from other anchor devices, or if the distance measurement has increased by an unrealistic amount relative to a previous sample of the distance measurement (indicating an unrealistic velocity of the control device). In some examples, a control device or moderator device may determine that a distance measurement from an anchor device is inconsistent if the distance measurement is too old relative to one or more of the other distance measurements.

In some examples, a distance measurement is determined to be inconsistent based on other factors. For example, the UWB signal strength (e.g., the strength of the ranging signal received from each anchor device) may be used to detect and ignore occluded anchor devices; a weak signal from an anchor device may indicate that the anchor device is occluded from the control device. In some examples, inconsistent measurements may be ignored (or weighted less heavily) in subsequent location calculations.

At block 806, an estimation of the location of the control device is determined based on the distance measurements received from the anchor devices. Optionally, the estimated location may be determined or adjusted using angle of arrival information received at block 802. In some examples, the estimated location of the control device is determined using an iterative algorithm that finds the point that minimizes the sum of squares of the measurement errors of the distance measurements.

At block 808, it is determined if the error in the estimated location is acceptable, such as by determining whether the error in the estimated location (and/or the distance measurements) is below a threshold. In some examples, if the error in the estimated location is acceptable, then the estimated location is used as the location of the control device in subsequent gesture control of target devices, optionally after low-pass filtering the estimated location to reduce jitter in the location.

If the error in the estimated location is not acceptable, then at block 810, one or more new estimated locations of the control device may be determined using one or more subsets of the anchor devices. For example, a first new estimated location may be determined using a first subset of the anchor devices, and a second new estimated location may be determined using a second (different) subset of the anchor devices.

At block 812, the one or more new estimated locations determined at block 810 are validated, such as by determining whether each new estimated location is physically possible or plausible (e.g., the estimated location is within the room, or within a reasonable distance of a previously determined location of the control device). The accuracy of the new estimated locations may also be evaluated. New estimated locations that are determined to be invalid or inaccurate may be excluded from subsequent processing.

At block 814, a weighted sum of the valid new estimated locations is calculated to obtain the location of the control device. In some examples, each valid estimated location is weighted with the inverse of the squared error for the estimated location. Optionally, the resulting location may be low-pass filtered to reduce jitter in the location.

Figure 9:
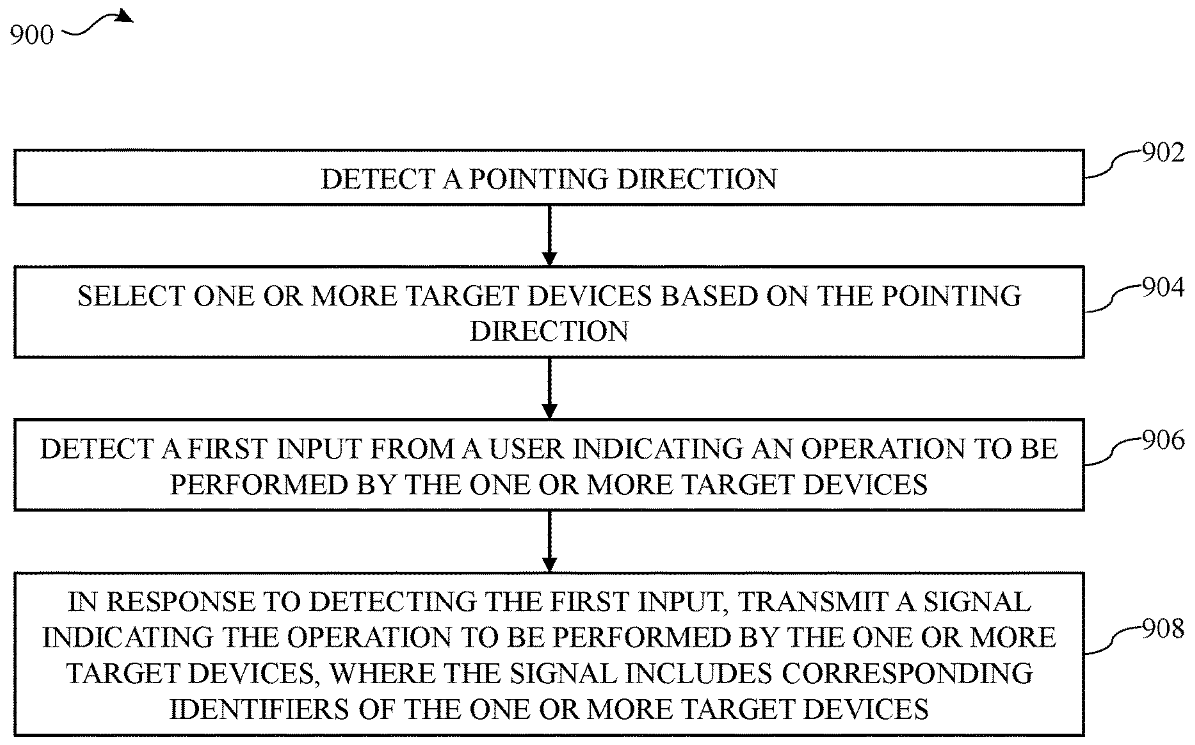
FIG. 9 illustrates an example flowchart for remote control of target devices based on detection of spatial information.

FIG. 9 illustrates an example flowchart of a method 900 of adjusting an estimated location of a control device in a system for control of devices based on detection of spatial information according to examples of the disclosure. The blocks of FIG. 9 may be performed by a system (such as system 100, 200).

At block 902, a pointing direction is detected. In some examples, the pointing direction is detected as described with reference to FIGS. 1-8. For example, the pointing direction may be detected by a control device worn by the user (such as by detecting a location and orientation of the control device relative to target devices), by a camera device that detects a movement of the user (such as by detecting an arm raise and/or pointing gesture), and/or by a target device that detects an infrared signal emitted by a control device worn or carried by the user.

At block 904, one or more target devices are selected based on the pointing direction detected at block 902 such as described with reference to FIGS. 1-8. In some examples, the one or more target devices are selected by determining a projection from a portion of the user (e.g., a hand, finger, arm, or head of the user) and/or from a control device held or carried by the user, such as depicted in FIG. 1.

At block 906, a first input from a user indicating an operation to be performed by the one or more selected target devices is detected. In some examples, the first input may be detected as described with respect to FIGS. 1-8. For example, the first input may be a physical gesture, such as a pinch gesture or a rotation gesture, detected by a control device and/or a camera device. For example, the first input may be an input to a user interface displayed by a control device. For example, the first input may be a verbal input detected by a control device.

At block 908, in response to detecting the first input at block 906, a signal is transmitted indicating the operation to be performed by the one or more target devices. The signal includes corresponding identifiers of the one or more target devices. In some examples, the signal is transmitted by a control device or a moderator device, as described with respect to FIGS. 1-4.

Therefore, according to the above, some examples of the disclosure are directed to an electronic device. The electronic device can comprise: one or more sensors configured to detect an orientation of the electronic device and processing circuitry coupled to the one or more sensors. The processing circuitry can be configured to cause the electronic device to: obtain a location of the electronic device and obtain an orientation of the electronic device. In accordance with a determination that a first gesture has been detected and that one or more first criteria are satisfied, the processing circuitry can be configured to cause the electronic device to the select a target device based on the location and the orientation. In accordance with a determination that a second gesture that satisfies one or more second criteria has been detected after the detection of the first gesture, the processing circuitry can be configured to cause the electronic device to transmit, to the selected target device, a signal representing an operation to be performed by the target device, the operation associated with the second gesture. Additionally or alternatively to one or more of the examples disclosed above, in some examples, the signal comprises an identifier of the target device. Additionally or alternatively to one or more of the examples disclosed above, in some examples, the processing circuitry is configured to cause the electronic device to determine whether the electronic device is operating in a first type of context, the first criteria including a first criterion that is satisfied when the electronic device is not operating in the first type of context. Additionally or alternatively to one or more of the examples disclosed above, in some examples, the processing circuitry is configured to cause the electronic device to determine a pose of a user, the first criteria including a second criterion that is satisfied based on the pose of the user. Additionally or alternatively to one or more of the examples disclosed above, in some examples, the one or more second criteria include a third criterion that is satisfied when a confirmation input has been received before the second gesture is detected. Additionally or alternatively to one or more of the examples disclosed above, in some examples, the one or more second criteria include a fourth criterion that is satisfied when the second gesture is associated with an operation to be performed by the target device. Additionally or alternatively to one or more of the examples disclosed above, in some examples, the one or more second criteria include a fifth criterion that is satisfied when the second gesture is detected within a pre-determined time duration of the detection of the first gesture. Additionally or alternatively to one or more of the examples disclosed above, in some examples, the processing circuitry is configured to cause the electronic device to, in accordance with the determination that the second gesture that satisfies the one or more second criteria has been detected, select, based on the second gesture, the operation from a plurality of operations associated with the target device. Additionally or alternatively to one or more of the examples disclosed above, in some examples, the processing circuitry is configured to cause the electronic device to receive a plurality of distance values from a corresponding plurality of anchor devices, and obtain the location of the electronic device by obtaining the location based on at least two of the plurality of distance values. Additionally or alternatively to one or more of the examples disclosed above, in some examples, the electronic device further comprises an ultra-wideband (UWB) sensor. The processing circuitry is configured to cause the electronic device to transmit one or more UWB signals using the UWB sensor before receiving the plurality of distance values. Additionally or alternatively to one or more of the examples disclosed above, in some examples, the processing circuitry is configured to cause the electronic device to obtain the location of the electronic device by causing the electronic device to: obtain an estimated location of the electronic device based on the at least two of the plurality of distance values; in accordance with a determination that the location of the electronic device satisfies one or more fourth criteria, use the estimated location of the electronic device as the location of the electronic device; and in accordance with a determination that the estimated location of the electronic device does not satisfy at least one of the one or more fourth criteria, obtain one or more angles of arrival associated with the plurality of anchor devices and obtain the location of the electronic device based on the one or more angles of arrival. Additionally or alternatively to one or more of the examples disclosed above, in some examples, the processing circuitry is configured to cause the electronic device to select the at least two of the distance values based on respective signal strengths associated with receiving the plurality of distance values. Additionally or alternatively to one or more of the examples disclosed above, in some examples, the processing circuitry is configured to cause the electronic device to select the at least two of the distance values based on respective sample ages associated with the plurality of distance values. Additionally or alternatively to one or more of the examples disclosed above, in some examples, the one or more fourth criteria include a sixth criterion that is satisfied when the estimated location is within a pre-determined distance of a previously determined location of the electronic device. Additionally or alternatively to one or more of the examples disclosed above, in some examples, the one or more fourth criteria include a seventh criterion that is satisfied when a path between a previously determined location of the electronic device and the estimated location does not traverse an obstacle. Additionally or alternatively to one or more of the examples disclosed above, in some examples, the target device is a virtual target device.

Some examples of the disclosure are directed to a method. The method can be performed by an electronic device comprising one or more sensors configured to detect an orientation of the electronic device and processing circuitry coupled to the one or more sensors. The method can comprise obtaining a location of the electronic device and obtaining an orientation of the electronic device. In accordance with a determination that a first gesture has been detected and that one or more first criteria are satisfied, selecting a target device based on the location and the orientation. In accordance with a determination that a second gesture that satisfies one or more second criteria has been detected after the detection of the first gesture, transmitting, to the selected target device, a signal representing an operation to be performed by the target device, the operation associated with the second gesture. Additionally or alternatively to one or more of the examples disclosed above, in some examples, the signal comprises an identifier of the target device. Additionally or alternatively to one or more of the examples disclosed above, in some examples, the method further comprises determining whether the electronic device is operating in a first type of context, the first criteria including a first criterion that is satisfied when the electronic device is not operating in the first type of context. Additionally or alternatively to one or more of the examples disclosed above, in some examples, the method further comprises determining a pose of a user, the first criteria including a second criterion that is satisfied based on the pose of the user. Additionally or alternatively to one or more of the examples disclosed above, in some examples, the one or more second criteria include a third criterion that is satisfied when a confirmation input has been received before the second gesture is detected. Additionally or alternatively to one or more of the examples disclosed above, in some examples, the one or more second criteria include a fourth criterion that is satisfied when the second gesture is associated with an operation to be performed by the target device. Additionally or alternatively to one or more of the examples disclosed above, in some examples, the one or more second criteria include a fifth criterion that is satisfied when the second gesture is detected within a pre-determined time duration of the detection of the first gesture. Additionally or alternatively to one or more of the examples disclosed above, in some examples, the method further comprises, in accordance with the determination that the second gesture that satisfies the one or more second criteria has been detected, selecting, based on the second gesture, the operation from a plurality of operations associated with the target device. Additionally or alternatively to one or more of the examples disclosed above, in some examples, the method further comprises receiving a plurality of distance values from a corresponding plurality of anchor devices, and obtaining the location of the electronic device by obtaining the location based on at least two of the plurality of distance values. Additionally or alternatively to one or more of the examples disclosed above, in some examples, the method further comprises transmitting one or more UWB signals, using a UWB sensor of the electronic device, before receiving the plurality of distance values. Additionally or alternatively to one or more of the examples disclosed above, in some examples, obtaining the location of the electronic device comprises obtaining an estimated location of the electronic device based on the at least two of the plurality of distance values; in accordance with a determination that the location of the electronic device satisfies one or more fourth criteria, using the estimated location of the electronic device as the location of the electronic device; and in accordance with a determination that the estimated location of the electronic device does not satisfy at least one of the one or more fourth criteria, obtaining one or more angles of arrival associated with the plurality of anchor devices and obtaining the location of the electronic device based on the one or more angles of arrival. Additionally or alternatively to one or more of the examples disclosed above, in some examples, the method further comprises selecting the at least two of the distance values based on respective signal strengths associated with receiving the plurality of distance values. Additionally or alternatively to one or more of the examples disclosed above, in some examples, the method further comprises selecting the at least two of the distance values based on respective sample ages associated with the plurality of distance values. Additionally or alternatively to one or more of the examples disclosed above, in some examples, the one or more fourth criteria include a sixth criterion that is satisfied when the estimated location is within a pre-determined distance of a previously determined location of the electronic device. Additionally or alternatively to one or more of the examples disclosed above, in some examples, the one or more fourth criteria include a seventh criterion that is satisfied when a path between a previously determined location of the electronic device and the estimated location does not traverse an obstacle. Additionally or alternatively to one or more of the examples disclosed above, in some examples, the target device is a virtual target device.

Some examples of the disclosure are directed to an electronic device. The electronic device can comprise processing circuitry configured to cause the electronic device to: receive, from a control device, a plurality of distance values; determine a location of the control device based on the plurality of distance values; receive, from the control device, an indication of an orientation of the control device; select a target device based on the location of the control device and the indication of the orientation of the control device; receive, from the control device, a first signal indicating that a first gesture has been detected by the control device; and transmit, in response to receiving the first signal, a second signal representing an operation associated with the first gesture to be performed by the target device. Additionally or alternatively to one or more of the examples disclosed above, in some examples, the second signal comprises an identifier of the target device.

Some examples of the disclosure are directed to a method. The method can be performed by an electronic device and can include detecting a pointing direction associated with an electronic device or with a user and selecting one or more target devices based on the pointing direction. The method can include detecting, at the electronic device, a first input from the user indicating an operation to be performed by the one or more target devices, and in response to detecting the first input, transmitting a signal indicating the operation to be performed by the one or more target devices, wherein the signal comprises one or more corresponding identifiers of the one or more target devices.

Additionally or alternatively to one or more of the examples disclosed above, in some examples, the pointing direction can include detecting, at the electronic device, a location of the electronic device relative to the one or more target devices.

Additionally or alternatively to one or more of the examples disclosed above, in some examples, detecting the pointing direction can include detecting, at an electronic device, an orientation of the electronic device relative to the one or more target devices.

Additionally or alternatively to one or more of the examples disclosed above, in some examples, detecting the pointing direction can include detecting, using one or more camera devices, a pointing gesture of the user.

Additionally or alternatively to one or more of the examples disclosed above, in some examples, detecting the pointing gesture can include detecting a movement of a first portion of the user, wherein the first portion of the user is a finger, hand, arm, or head of the user.

Additionally or alternatively to one or more of the examples disclosed above, in some examples, detecting the pointing direction can include detecting, by a second electronic device, an infrared signal emitted by the electronic device.

Additionally or alternatively to one or more of the examples disclosed above, in some examples, detecting the first input can include detecting a second gesture of the user.

Additionally or alternatively to one or more of the examples disclosed above, in some examples, detecting the first input can include detecting a verbal input.

Additionally or alternatively to one or more of the examples disclosed above, in some examples, detecting the first input can include detecting an input to an element of a user interface of an electronic device, where the element is associated with the operation.

Additionally or alternatively to one or more of the examples disclosed above, in some examples, the operation can include an on/off operation or a volume change operation.

Additionally or alternatively to one or more of the examples disclosed above, in some examples, the one or more target devices can be multiple target devices.

Additionally or alternatively to one or more of the examples disclosed above, in some examples, detecting the pointing direction can include detecting that the user or the electronic device is pointing in the direction of the one or more target devices.

Additionally or alternatively to one or more of the examples disclosed above, in some examples, detecting the pointing direction can include detecting that the user or the electronic device is pointing in the direction of a zone associated with the one or more target devices.

Additionally or alternatively to one or more of the examples disclosed above, in some examples, the one or more target devices are not located within the zone.

Some examples of the disclosure are directed to an electronic device. The electronic device can comprise processing circuitry configured to cause the electronic device to detect a pointing direction, select one or more target devices based on the pointing direction, detect a first input from a user of the electronic device indicating an operation to be performed by the one or more target devices, and in response to detecting the first input, transmit a signal indicating the operation to be performed by the one or more target devices, wherein the signal comprises one or more corresponding identifiers of the one or more target devices.

Additionally or alternatively to one or more of the examples disclosed above, in some examples, the processing circuitry is configured to detect the pointing direction by detecting a location of the electronic device relative to the one or more target devices.

Additionally or alternatively to one or more of the examples disclosed above, in some examples, the processing circuitry is configured to detect the pointing direction by detecting an orientation of the electronic device relative to the one or more target devices.

Additionally or alternatively to one or more of the examples disclosed above, in some examples, the processing circuitry is configured to detect the pointing direction by detecting, using one or more camera devices, a pointing gesture of the user.

Additionally or alternatively to one or more of the examples disclosed above, in some examples, the processing circuitry is configured to detect the pointing direction by detecting a movement of a first portion of the user, wherein the first portion of the user is a finger, hand, arm, or head of the user.

Additionally or alternatively to one or more of the examples disclosed above, in some examples, the processing circuitry is configured to detect the pointing direction by receiving, from a second electronic device, an indication of the pointing direction.

Additionally or alternatively to one or more of the examples disclosed above, in some examples, the processing circuitry is configured to detect the first input by detecting a second gesture of the user.

Additionally or alternatively to one or more of the examples disclosed above, in some examples, the processing circuitry is configured to detect the first input by detecting a verbal input.

Additionally or alternatively to one or more of the examples disclosed above, in some examples, the processing circuitry is configured to detect the first input by detecting an input to an element of a user interface, wherein the element is associated with the operation.

Additionally or alternatively to one or more of the examples disclosed above, in some examples, the operation includes an on/off operation or a volume change operation.

Additionally or alternatively to one or more of the examples disclosed above, in some examples, the one or more target devices are a plurality of target devices.

Additionally or alternatively to one or more of the examples disclosed above, in some examples, the processing circuitry is configured to detect the pointing direction by detecting that the user or the electronic device is pointing in the direction of the one or more target devices.

Additionally or alternatively to one or more of the examples disclosed above, in some examples, the processing circuitry is configured to detect the pointing direction by detecting that the user or the electronic device is pointing in the direction of a zone associated with the one or more target devices.

Additionally or alternatively to one or more of the examples disclosed above, in some examples, the one or more target devices are not located within the zone.

Some examples of the disclosure are directed to an electronic device. The electronic device can include one or more sensors configured to detect a location, orientation, or both of the electronic device, and processing circuitry coupled to the one or more sensors, the processing circuitry configured to cause the electronic device to detect a pointing direction associated with the electronic device, select one or more target devices based on the pointing direction, detect a first input from a user of the electronic device, the first input indicating an operation to be performed by the one or more target devices; in response to detecting the first input, transmit a signal indicating the operation to be performed by the one or more target devices, where the signal comprises one or more corresponding identifiers of the one or more target devices.

Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising processing circuitry configured to cause the electronic device to:

detect a pointing direction;

detect a first gesture;

in accordance with a determination that the first gesture corresponds to a request to select one or more target devices and that one or more first criteria are satisfied, select the one or more target devices based on the pointing direction; and in accordance with a determination that the first gesture corresponds to the request to select one or more target devices and that the one or more first criteria are not satisfied, forgo selecting the one or more target devices based on the pointing direction;

wherein the one or more first criteria include a first criterion that is satisfied when the electronic device is operating in a first type of context when the first gesture is detected, and wherein the processing circuitry is further configured to cause the electronic device to:

while the one or more target devices are selected, in accordance with a determination that a second gesture, different than the first gesture, that satisfies one or more second criteria is detected, detect a first input from a user of the electronic device indicating an operation to be performed by the one or more target devices; and in response to detecting the first input, transmit a signal indicating the operation to be performed by the one or more target devices, wherein the operation is associated with the second gesture.

2. The electronic device of claim 1, wherein the processing circuitry is configured to detect the pointing direction by detecting a location of the electronic device relative to the one or more target devices.

3. The electronic device of claim 1, wherein the processing circuitry is configured to detect the pointing direction by detecting an orientation of the electronic device relative to the one or more target devices.

4. The electronic device of claim 1, wherein the processing circuitry is configured to detect the pointing direction by detecting, using one or more camera devices, a pointing gesture of the user.

5. The electronic device of claim 1, wherein the processing circuitry is configured to detect the pointing direction by receiving, from a second electronic device, an indication of the pointing direction.

6. The electronic device of claim 1, wherein the processing circuitry is configured to detect the first input by detecting the second gesture of the user.

7. The electronic device of claim 1, wherein the processing circuitry is configured to detect the first input by detecting a verbal input.

8. The electronic device of claim 1, wherein the operation comprises an on/off operation or a volume change operation.

9. The electronic device of claim 1, wherein the processing circuitry is configured to detect the pointing direction by detecting that the user or the electronic device is pointing in the direction of the one or more target devices.

10. A method comprising:

detecting a pointing direction associated with an electronic device or with a user;

detecting a first gesture;

in accordance with a determination that the first gesture corresponds to a request to select one or more target devices and that one or more first criteria are satisfied, selecting the one or more target devices based on the pointing direction; and in accordance with a determination that the first gesture corresponds to the request to select one or more target devices and that the one or more first criteria are not satisfied, forgoing selecting the one or more target devices based on the pointing direction;

wherein the one or more first criteria include a first criterion that is satisfied when the electronic device is operating in a first type of context when the first gesture is detected, and wherein the method further comprises:

while the one or more target devices are selected, in accordance with a determination that a second gesture, different than the first gesture, that satisfies one or more second criteria is detected, detecting a first input from the user of the electronic device indicating an operation to be performed by the one or more target devices; and in response to detecting the first input, transmitting a signal indicating the operation to be performed by the one or more target devices, wherein the operation is associated with the second gesture.

11. The method of claim 10, wherein detecting the pointing direction comprises detecting, at the electronic device, a location of the electronic device relative to the one or more target devices.

12. The method of claim 10, wherein detecting the pointing direction comprises detecting, at the electronic device, an orientation of the electronic device relative to the one or more target devices.

13. The method of claim 10, wherein detecting the pointing direction comprises detecting, using one or more camera devices, a pointing gesture of the user.

14. The method of claim 10, wherein detecting the pointing direction comprises detecting, by a second electronic device, an infrared signal emitted by the electronic device.

15. The method of claim 10, wherein detecting the first input comprises detecting an input to an element of a user interface of the electronic device, wherein the element is associated with the operation.

16. The method of claim 10, wherein the operation comprises an on/off operation or a volume change operation.

17. The method of claim 10, wherein the one or more target devices are a plurality of target devices.

18. The method of claim 10, wherein detecting the pointing direction comprises detecting that the user or the electronic device is pointing in the direction of the one or more target devices.

19. A non-transitory computer readable storage medium storing one or more programs, the one or more programs comprising instructions, which when executed by processing circuitry of an electronic device, cause the electronic device to perform a method comprising:

detecting a pointing direction associated with the electronic device or with a user;

detecting a first gesture;

in accordance with a determination that the first gesture corresponds to a request to select one or more target devices and that one or more first criteria are satisfied, selecting the one or more target devices based on the pointing direction; and in accordance with a determination that the first gesture corresponds to the request to select one or more target devices and that the one or more first criteria are not satisfied, forgoing selecting the one or more target devices based on the pointing direction;

wherein the one or more first criteria include a first criterion that is satisfied when the electronic device is operating in a first type of context when the first gesture is detected, and wherein the method further comprises:

while the one or more target devices are selected, in accordance with a determination that a second gesture, different than the first gesture, that satisfies one or more second criteria is detected, detecting a first input from the user of the electronic device indicating an operation to be performed by the one or more target devices; and in response to detecting the first input, transmitting a signal indicating the operation to be performed by the one or more target devices, wherein the operation is associated with the second gesture.

20. The non-transitory computer readable storage medium of claim 19, wherein detecting the pointing direction comprises detecting, at the electronic device, an orientation of the electronic device relative to the one or more target devices.

* * * * *